No. 765,779. PATENTED JULY 26, 1904.
J. C. KUYPER.
ANTI-SIDE DRAFT ATTACHMENT FOR HARVESTERS.
APPLICATION FILED SEPT. 21, 1903.
NO MODEL.
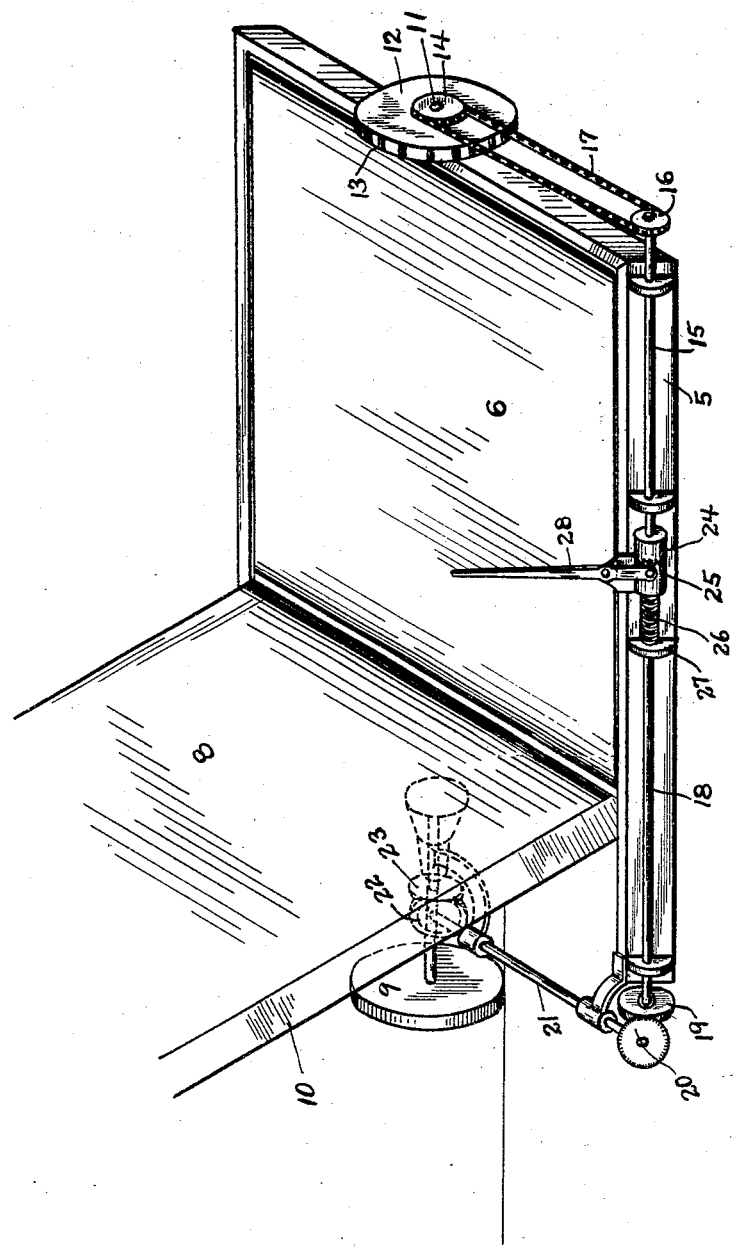
Witnesses
le Morgan.
Fred E Jones
Inventor
J. C. KUYPER.
By
Attorneys No. 765,779.

Patented July 26, 1904.

UNITED STATES PATENT OFFICE.

JAMES C. KUYPER, OF ROCK VALLEY, IOWA.

ANTI-SIDE-DRAFT ATTACHMENT FOR HARVESTERS.

SPECIFICATION forming part of Letters Patent No. 765,779, dated July 26, 1904.

Application filed September 21, 1903. Serial No. 174,091. (No model.)

*To all whom it may concern:*

Be it known that I, JAMES C. KUYPER, a citizen of the United States, residing at Rock Valley, in the county of Sioux, State of Iowa, have invented certain new and useful Improvements in Anti-Side-Draft Attachments for Harvesters; and I do hereby declare the following to be a full, clear, and exact description of the invention, such as will enable others skilled in the art to which it appertains to make and use the same.

This invention relates to harvesters; and it has for its object to provide means for holding the platform of the harvester up to the grain with the cutter-bar at right angles to the direction of progress of the machine, so that the rearward displacement of the outer end of the table and of the cutter-bar due to pressure against the grain will be prevented.

In the drawings forming a portion of this specification there is shown a perspective view of a portion of a harvester equipped with an attachment embodying the present invention.

Referring now to the drawings, there is illustrated an embodiment of the invention wherein 5 is the platform of a binder, provided with the usual apron 6, onto which falls the grain as it is cut by the cutter mechanism (not shown) at the front edge of the platform.

8 represents an elevating-apron, and 9 a ground-wheel which is arranged in the arch of the main frame 10 of the binder.

Upon the outer end of the platform 5 is a spindle 11, on which is mounted a ground-wheel 12, having peripheral cleats 13, which prevent slipping of the wheel, and on the hub of the wheel is a sprocket-wheel 14.

At the rear side of the platform 5 is mounted a horizontal shaft 15, which projects at one end beyond the outer end of the platform and is provided with a sprocket-wheel 16, with which is engaged a sprocket-chain 17, engaged also with the sprocket-wheel 14. Mounted in suitable bearings at the rear side of the platform 5 and alining with the shaft 15 is a second shaft 18, having a bevel-gear 19 at its outer end, which meshes with a similar gear 20 on a shaft 21, which is driven from the wheel 9 by means of intermeshing gears 22 and 23 on the shaft and wheel, respectively.

On the inner end of the shaft 15, which is adjacent to the shaft 18, is fixed a clutch member 24, having a clutch-face at its free end, and splined upon the shaft 18 is a second clutch member 25, having a clutch-face at its outer end which is movable into and out of engagement with the member 24 as the member 25 is reciprocated. A helical spring 26 is mounted upon the shaft 18 and rests with one end against the pillar-block 27 and the other end against the bearing member 25. The members 24 and 25 have ratchet clutch-faces—that is, their clutch-faces are in the form of ratchet-teeth—so that if the wheel 12 be rotated backwardly, as in turning the implement, the clutch-faces will slip. With this arrangement it will be seen that as the implement advances the wheel 12 is positively rotated, and the driving mechanism is such and is so proportioned that the speed of rotation of the wheel 12 is sufficient to urge the outer end of the platform ahead at a slightly-faster rate than the main body of the machine, there being, however, a slight slip in the actual operation of the machine, owing to the insecure holding of the cleats 13 on the ground. To positively disengage the clutch-faces, a hand-lever 28 is provided, which is engaged with or connected to the member 25 for sliding the latter against the tension of the spring 26.

What is claimed is—

The combination with a harvester and a ground-wheel under the main frame, of a ground-wheel carried by the outer end of the grain-receiving platform, and means connected between the first wheel and the second wheel for rotating the latter with its periphery at a higher rate of speed than the former, said means consisting of a sprocket-wheel mounted upon the hub of the second wheel, a shaft mounted at the rear side of the platform of the harvester, the said shaft projecting at one end beyond the outer end of said platform, a sprocket-wheel mounted upon the projecting end of the said shaft, and connected to the first-named sprocket-wheel by means of a sprocket-chain, a second shaft mounted at the rear side of the platform in alinement with the first-named shaft, clutch members disposed upon the adjacent ends of the said shafts, the said clutch members being adapted to be engaged and disengaged, a beveled gear mounted upon the outer end of the last-mentioned shaft, a second beveled gear engaged with the first-mentioned beveled gear, a shaft upon which said second bevel-gear is fixed and means for rotating said shaft from the ground-wheel.

In testimony whereof I affix my signature in presence of two witnesses.

JAMES C. KUYPER.

Witnesses:
   GEO. D. SIEMEN,
   NEAL MOUW.